United States Patent [19]

Schlanert et al.

[11] 4,040,581
[45] Aug. 9, 1977

[54] REVERSE THRUST LIMITING SYSTEM

[75] Inventors: George A. Schlanert, Tustin; Lorin A. Wood, Lakewood; Gerald A. Rayburn, Garden Grove, all of Calif.

[73] Assignee: McDonnell Douglas Corporation, Long Beach, Calif.

[21] Appl. No.: 656,129

[22] Filed: Feb. 6, 1976

[51] Int. Cl.$^2$ ............................................. B64C 13/30
[52] U.S. Cl. .................................. 244/83 K; 74/506; 74/526
[58] Field of Search ............ 244/83 K, 83 G, 110 B, 244/81; 74/506, 505, 501 R, 491, 526; 254/174, 175.7

[56] References Cited
U.S. PATENT DOCUMENTS 2,446,700  8/1948  Giles et al. .................... 74/501 X Primary Examiner—Trygve M. Blix
Assistant Examiner—Barry L. Kelmachter
Attorney, Agent, or Firm—Henry M. Bissell

[57] ABSTRACT

A system for reliably limiting the maximum positions to which the power control lever of an aircraft engine may be set in the thrust reversal mode corresponding to whether the aircraft is in the air or on the ground. A plurality of cable drums, one for each of the power control lines extending between the cockpit and the engines of a multi-engine aircraft, is associated with an adjustable stop mechanism which provides a first stop position for the cable drum when the aircraft is in the air with landing gear up and a second stop position permitting increased reverse thrust when the aircraft is on the ground. The system is coordinated with the landing gear position sensing system of the aircraft and works in conjunction with presently installed thrust reversing systems. The system includes an arrangement for moving the elements to a safe, non-jamming position in the event of linkage failure and incorporates circuitry with suitable instrument panel lights to give indications of readiness for use and system failure. The system is designed for installation without modification of engine thrust reversal mechanisms or cockpit controls.

19 Claims, 6 Drawing Figures

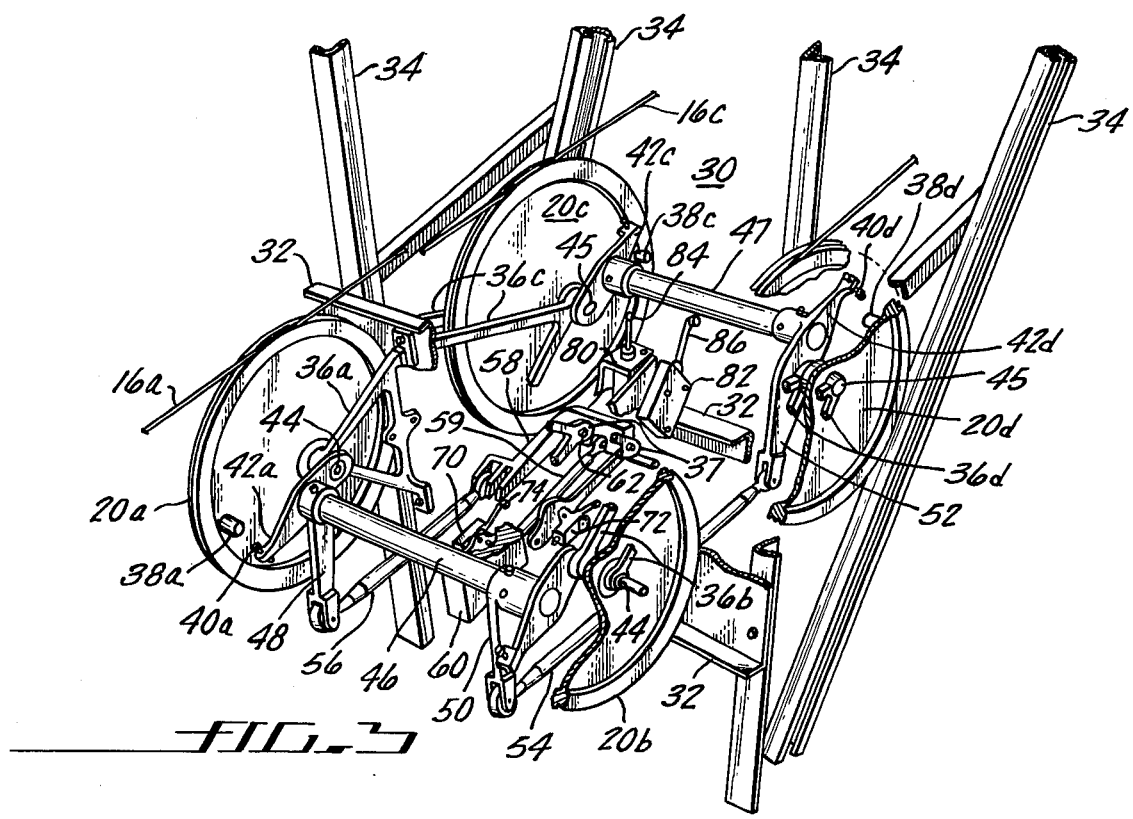
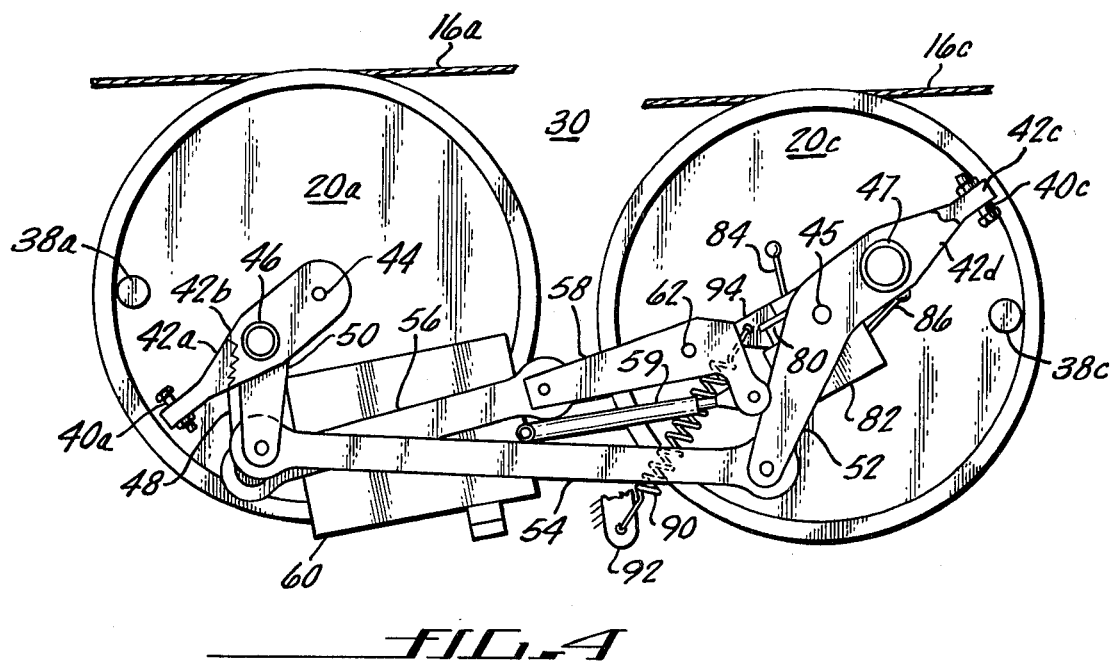

REVERSE THRUST LIMITING SYSTEM

BACKGROUND OF THE INVENTION

1. Field of the Invention

This invention relates to aircraft control systems and, more particularly, to systems for limiting the maximum amount of reverse thrust which may be made available in accordance with different operating conditions of the aircraft.

2. Description of the Prior Art

Thrust reversing systems are commonly used on passenger and the larger cargo carrying jet aircraft. These thrust reversing systems are provided in order to permit the aircraft to decelerate more rapidly without such heavy dependence upon the wheel braking systems, once the aircraft are on the ground. One such system which is in common use has a plurality of deflector buckets that are moved into position in the jet exhaust when operation in the thrust reversing mode is desired. Once the thrust reversing system is in the activated position, the engine power control levers are moved to an advanced power setting and the engines wind up accordingly with the thrust now being deflected forward by the deflector buckets so that the desired reverse thrust is developed.

Special aircraft are now being developed for transporting cargo and/or passengers into landing fields shorter in length than those used by conventional aircraft. Known as STOL (Short TakeOff and Landing) aircraft, these planes need to be able to reduce their speed in the air with greater deceleration than is possible with available flap braking systems. Thrust reversing from the engines is available, as it is for deceleration once the aircraft has landed, but it is necessary to limit such thrust reversal to a greater degree than is required or even desired for thrust reversing after landing. If thrust reversal is to be employed during the landing approach or at any other time when the aircraft is airborne, it is important that the pilot be able to set the engine power control levels in the maximum thrust reversal position without having to look to determine the proper maximum power setting in the thrust reversal position. This calls for some kind of a lever stop mechansim in the power control system. However, a higher power setting is called for in use of the thrust reversal system after landing, which means that a different stop position is needed for thrust reversal after the aircraft has landed.

In-flight thrust reversal requires a reliable means of limiting the engine power control setting to prevent excessive reverse thrust power with possible damage to the structure and reduced operational reliability. The reverse thrust limiter must be capable of engaging or disengaging the engine power control system in a manner which precludes jamming or unsafe operation at any position of the throttle. Variation of the reverse thrust limiter position with temperature or power control system friction should be minimized in order to insure sufficient, but not excessive, power in in-flight thrust reversal operation.

SUMMARY OF THE INVENTION

In brief, arrangements in accordance with the present invention meeting the above-recited criteria incorporate a cable drum, one for each engine power control cable system extending between the engine and the cockpit, and mechanical linkages interconnecting the plurality of cable drums to a single stop actuator. Each cable drum is individually rotatable about a pivot axis by its associated power control drive cable. Each cable drum has a fixed stop pin projecting laterally from a point near its periphery for engagement by a corresponding movable cable drum stop controlled by the actuator. Drive circuitry for the actuator is controlled by the selector lever for the landing gear positioning system. Thus, when the landing gear lever is in the "gear down" position, the actuator is driven to an extended position in which the cable drum stops are set to permit increased thrust reversing power. Similarly, when the landing gear lever is in the "gear up" position, the actuator moves to a retracted position in which the cable drum stops are located so as to limit reverse thrust at a reduced power setting.

Although the reverse thrust limiting apparatus is ganged together by interconnecting linkages in order to permit movement and positioning thereof from a single actuator, the individual cable drums which provide limitation of movement of the associated power control systems in accordance with the settings of the stops are independently movable. This is necessary in order to permit each engine to be operated independently of the others. Such independent operation may be required under certain conditions, as for example in the event of the loss of power in one engine, in which case it is desired to be able to use the thrust reversing system with some of the remaining engines without using the engine on the other side which corresponds to the engine which has failed. Without this capability of independent engine control operation, a condition of asymmetric reverse thrust might develop with possibly disastrous consequences.

Electrical limit switches in the actuator drive circuitry are provided to interrupt power to the actuator when the limit of extension or retraction is reached. Annunciator lights are provided on the cockpit instrument panel to warn the pilot in the event of failure of the system. Thus, if the actuator has failed to move the limiting system to the reduced power setting position when the landing gear is up and locked, a warning light is illuminated to indicate that the thrust reversal system should not be used. Similarly, if the actuator has failed to move the limiting system out of the reduced power stop position when the landing gear is down and locked, another warning light is illuminated to indicate to the pilot that the thrust reversing system is limited at the reduced power setting.

The system of the invention includes a fail-safe mechanism to take care of the eventuality that one of the interconnecting links in the linkage train between the actuator and the last stop drive member might fail or become disconnected. This fail-safe mechanism incorporates a spring attached to the stop crank which is used to activate switches in the instrument warning light circuits and serves to move this crank away from the switches so that the occurrence of a failure in the system is indicated to the pilot.

BRIEF DESCRIPTION OF THE DRAWING

A better understanding of the present invention may be had from a consideration of the following detailed description, taken in conjunction with the accompanying drawing in which:

FIG. 3 is a perspective view, partially broken away, showing apparatus embodying the invention;

FIG. 4 is a schematic representation of a portion of the apparatus of FIG. 3 showing one position thereof;

DESCRIPTION OF THE PREFERRED EMBODIMENT

Figure 1:
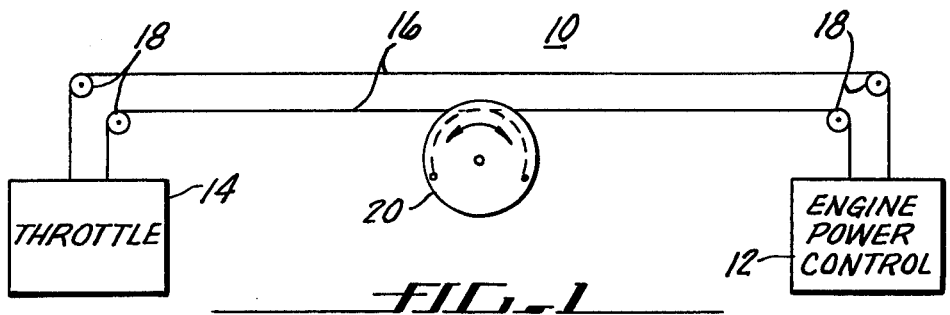
FIG. 1 is a block diagram illustrative of the invention.

FIG. 1 illustrates the relationship of apparatus of the present invention to salient elements of a conventional aircraft engine power control system. In such a system 10 as illustrated in FIG. 1, an engine power control element 12 (typically the engine cross shaft) at the individual engine is linked to a throttle element 14 in the pilot compartment by means of throttle bridle cables 16. The cables 16 extend over a variety of pulleys such as 18 to establish the appropriate path between the engine and pilot control elements 12, 14. Apparatus in accordance with the present invention is coupled to such a system by means of a cable drum 20 mounted along the path of the throttle bridle cable 16 with one or more wraps, as appropriate, of the cable 16 taken around the drum 20. In accordance with the present invention, and as described more particularly hereinbelow, the maximum rotation of the drum 20 is selectively limited in the reverse thrust direction, thus limiting the extent to which the cables 16 may direct the travel of the engine power control element 12.

Figure 2:
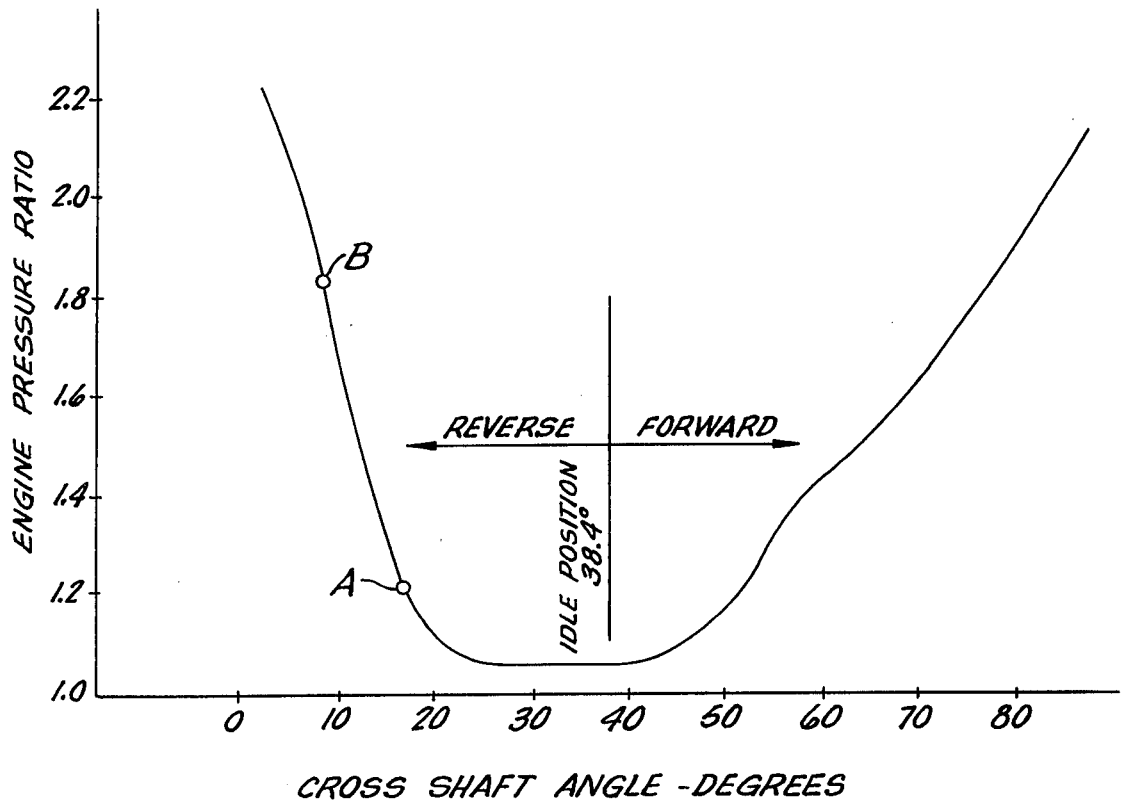
FIG. 2 is a graph showing the determination of power control limit points as related to engine operating parameters.

FIG. 2 illustrates the plot of engine pressure ratio, which is proportional to thrust, as a function of engine cross shaft angle. The curve shown in FIG. 2 corresponds to a single ambient temperature and is representative of the family of such curves that are applicable for various ambient temperatures such as may be encountered in engine operation. FIG. 2 shows the engine idle position to be at a cross shaft angle of 38.4° with forward engine thrust being developed at larger cross shaft angles and reverse engine thrust being developed at cross shaft angles less than the engine idle position.

Reverse thrust systems presently in use for deceleration during landing roll limit cross shaft angle at somewhere between 0° and 10° by the mechanism employed at the pilot throttle control position. In the instant case, it is desired to limit the reverse thrust during in-flight thrust reversal at an engine pressure ratio of approximately 1.2, corresponding to a first cross shaft angle position of near 20° (point A of FIG. 2). This will provide the desired reverse thrust power for in-flight deceleration below a level which might cause damage to aircraft structure and possible reduced operational reliability. When the aircraft is on the ground after landing, the first position limitation is removed so that the substantially increased reverse thrust corresponding to an engine pressure ratio of approximately 1.8 (corresponding to the point B of FIG. 2) with a cross shaft angle of between 0° and 10° is available.

Apparatus 30 in accordance with the present invention is shown in FIG. 3 as comprising a plurality of cable drums 20 interconnected and mounted to operate in unison. Four such cable drums 20 are shown in FIG. 3, each coupled to a separate throttle bridle cable 16 in the manner indicated in FIG. 1, as may be provided for reverse thrust limiting control of a four engine aircraft. As represented in FIG. 3, drums 20a and 20b are coupled into the power control systems of outboard engines Nos. 1 and 4 respectively, and are located in the figure forward of drums 20c and 20d which are coupled into the power control systems of inboard engines Nos. 2 and 3 respectively. The entire assembly of the drums 20 and interconnected actuator, levers, links, etc. is mounted on a support bracket or plate 32, portions of which are represented with the remainder broken away for clarity, which is adapted for mounting on the aircraft fuselage framework 34. Thus, the entire assembly may be readily installed by mounting it in the fashion shown and by leading the thrust bridle cables 16 over the respective cable drums 20 with sufficient lengthening of the cables 16 to accommodate the additional travel around the drums. Individual drum support brackets 36 and actuator support brackets 37 are provided for mounting the various elements of the apparatus 30 to the master support bracket 32, portions of the brackets 36 and 37 being broken away for clarity of illustration.

Each of the cable drums 20 is provided with a stop pin 38, such as the pin 38a as shown on cable drum 20a mounted near the periphery thereof for rotation with the associated drum. At the corresponding radial distance of the stop pin 38, there is provided for each cable drum 20 a stop pad 40 adjustably mounted in a drum stop arm 42. The drum stop arms 42 are mounted for rotation about the axes 44, 45 of the associated cable drums 20 as supported by the brackets 36, 37. The drum stop arms 42 of the power control systems for corresponding pairs of engines—for example, the arms 40a and 40b for the systems of Nos. 1 and 4 engines or the arms 40c and 40d for the control systems of the Nos. 2 and 3 engines—are secured together for movement in unison by torque tubes 46 and 47 respectively. The forward torque tube 46 has fixedly mounted thereon a pair of torque tube levers 48 and 50, while the stop arm 40d, affixed to the aft torque tube 47, is provided with a torque tube lever extension lever 52. The torque tube levers 50 and 52 are coupled together by means of an adjustable torque tube link 54 for driving the rotation of the torque tube 47 with its attached drum stop arms 42c and 42d in unison with the forward torque tube 46 with its attached drum stop arms 42a and 42b. Forward torque tube 46 is driven in turn by an actuator link 56 extending between the outward end of the torque tube lever 48 and an actuator lever 58 coupled to the drive rod 59 of a stop actuator 60. The actuator lever 58 is mounted for rotation about a pivot axis 62 established by the support brackets 37 as the actuator 60 drives the actuator rod 59 between respective extended and retracted positions.

Figure 5:
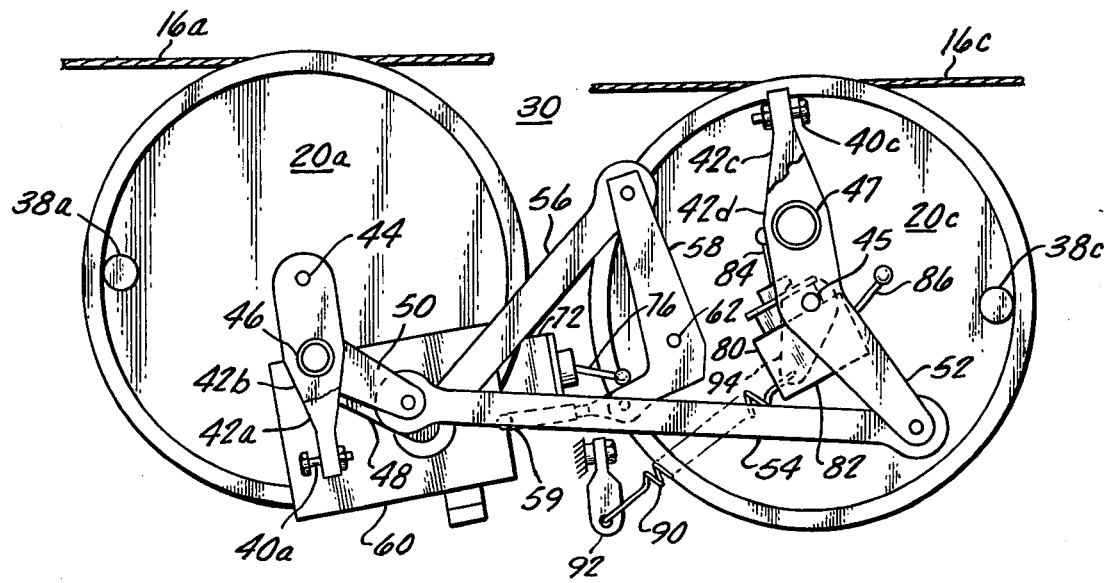
FIG. 5 is a schematic representation of a portion of the apparatus of FIG. 3, showing an alternative position thereof.

The operation of the apparatus 30 of FIG. 3 may be explained more effectively by reference to FIGS. 4 and 5 which are schematic diagrams showing the cable drums 20a and 20c with associated interconnecting linkages as viewed from the plane of the cable drums 20b and 20d.

As shown in FIG. 4, the apparatus 30 is in the reverse thrust power limiting position (the first position A of FIG. 2) in which the actuator 60 has driven the actuator rod 59 to its extended position. In FIG. 5, the opposite is the case with the apparatus 30 arranged to correspond to the second position B of FIG. 2 with the actuator rod 59 being driven to the retracted position. It will be understood that this position as shown in FIG. 5 may be a second selected stop position for the apparatus 30 or, alternatively, it may be a non-limiting position in which the stop pins 38 attached to the respective cable drums 20 are not restricted by the apparatus 30 from travel to the limit of the associated systems to which the cable 16 are coupled. In both FIGS. 4 and 5, the nearside drum stop arms 42b and 42d are partially broken away in order to show the respective drum stop arms 42a and 42c in line therewith, consistent with the representation of the cable drums 20a and 20c and their respective stop pins 38a and 38c.

Referring again to FIG. 3, there is shown therein a pair of actuator limit switches 70 and 72 mounted for operation at the respective limits of travel of the actuator rod 59. As indicated in FIG. 3, which shows the actuator rod 59 in the extended position corresponding to the position of the apparatus 30 in FIG. 4, switch lever 74 of the extend limit switch 70 is contacted by the actuator lever 58, thereby serving to interrupt the circuit to the extension drive of the actuator 60 so that the actuator rod 59 remains in the extended position. When the retraction drive of the actuator 60 is energized to withdraw the rod 59 to its retracted position, as shown in FIG. 5, a switch lever 76 of the retract limit switch 72 is contacted by the actuator lever 58 so as to interrupt the circuit thereto.

With the apparatus 30 in the reverse thrust power limiting position illustrated in FIG. 4, the throttle bridle cables 16 may be moved forward only so far as is permitted by the counterclockwise rotation of the cable drums 20 to a point where the associated stop pin 38 contacts the stop pad 40 of the associated drum stop arm 42. This is the in-flight position in which the reverse thrust power must be limited to a relatively low level. This of course has no limiting effect with respect to forward thrust, since this is controlled by movement of the cables 16 in the opposite direction with corresponding rotation of the associated drums 20 in a clockwise direction. It will be noted that each of the cables may be operated independently to the limiting position established by the apparatus 30 and that all or any number of the cables 16 may be moved in unison with assurance that they will be stopped at the limiting position.

With the apparatus 30 in the position shown in FIG. 5, the drum stop arms 42 with associated stop pads 40 are withdrawn to a position which permits further counterclockwise rotation of the drums 20 and associated stop pins 38 so that the greater power levels for reverse thrust may be realized, as needed for on-the-ground deceleration.

Also shown in FIGS. 3, 4, and 5 is a pair of position sensing switches 80 and 82, each with an associated switch lever 84 or 86 mounted in position so that the levers 84 and 86 are engaged by the torque tube 47 at its respective limits of travel. Thus, sensing switch 80 is located to detect the position of the apparatus 30 in the unlimited or second position mode, corresponding to the retraction of the actuator rod 59, whereas the sensing switch 82 is located to detect the position of the apparatus 30 (see FIG. 4) in the thrust limiting or first position. As will be described hereinafter, the sense switches 80, 82 are used to provide annunciator indications to the pilot relative to the condition of the apparatus 30.

Also shown in FIGS. 4 and 5 is a safety spring 90 extending between spring mounts 92 and 94, mount 92 being affixed to a support bracket of the apparatus 30 and mount 94 being affixed for rotation with the torque tube 47 about the pivot axis 45. The purpose of the spring 90 is to provide an indication to the pilot in the event of any separation in the linkages extending between the actuator 60 and the farthest downstream torque tube lever 52. Such a separation might occur with the loss of a connecting pin or the actual failure of a connecting link. If such linkage separation occurs, the spring 90 causes rotation of the aft torque tube 47 away from contact with either of the switch levers 84 or 86, which condition with neither of the switches 80 or 82 being activated is interpreted as a failure signal in the pilot's compartment with respect to the reverse thrust power limiting system.

Figure 6:
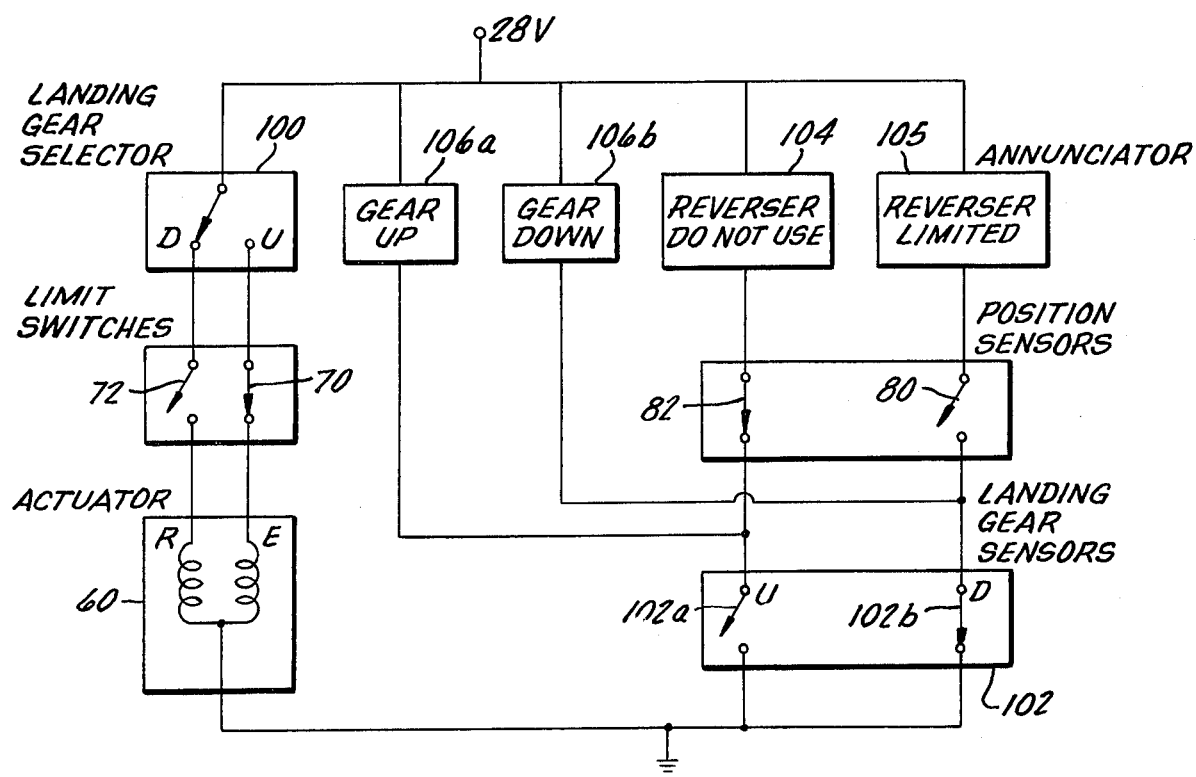
FIG. 6 is a schematic diagram showing circuitry included in apparatus of the present invention.

FIG. 6 is a schematic diagram illustrating the actuator and the annunciator circuitry associated with the apparatus of the present invention. In this circuitry, the limit switches 70, 72 and the position sensing switches 80, 82, are all of the normally closed type. The retract limit switch 72 is connected in series with the retract drive of the actuator 60 whereas the extend limit switch 70 is connected in series with the extend drive of the actuator 60. Both of these parallel circuits are connected in series with the landing gear selector switch 100, the retract circuit being connected to the down contact of the selector switch 100 and the extend circuit being connected in series with the up contact of the selector switch 100. Corresponding landing gear sensors 102 are activated when the landing gear is in one or the other of its two selected conditions either down and locked or up and locked. The systems includes annunciators 104 and 105, preferably indicator lights, to indicate to the pilot the condition of the thrust reverse limiting apparatus. Annunciator 104, indicating "Reverser Do Not Use", is in series with the extend sensing switch 82 and the gear-up sensor switch 102a. The annunciator 105, indicating "Reverser Limited", is in series with the extend sensing switch 80 and the landing gear-down sensor switch 102b. The annunciators 104, 105 may be read by the pilot in conjunction with the conventional landing gear position annunciators 106 to govern his use of the thrust reversing system of the aircraft, and also to provide an indication of a failure of the reverse thrust power limiting position system.

As shown in FIG. 6, the landing gear selector is set to the down position and, in response thereto, the actuator 60 has retracted until the retract limit switch 72 is opened, thus removing power from actuator 60. The apparatus 30 is moved to the second position (as shown in FIG. 5) and the sense switch 80 is opened. The landing gear is down and locked as indicated by the closure of the switch 102b. In the situation shown in FIG. 6, the gear-down annunciator 106b is illuminated but neither of the reverser annunciators 104, 105 is activated. With the gear down and locked, if the switch 80 had not opened, thus indicating that the reverse thrust limiting apparatus was not in the second position, the Reverser Limited annunciator 105 would be illuminated, thus indicating to the pilot that he would not have full reverse thrust available for landing deceleration.

When the landing gear selector 100 is moved to the up position, the extend circuit of actuator 60 is energized until it is fully extended, at which point the extend limit switch 70 opens and deenergizes the actuator 60. This should result in the closure of position sensor switch 80 and the opening of switch 82. Switch 102a closes to indicate that the gear is up and locked. Under proper operating conditions, again neither of the reverser annunciators 104, 105 will be illuminated. However, if the position sensor switch 82 is not opened, corresponding to the condition where the reverse thrust limiting apparatus has not moved to the limiting position, the Reverser Do Not Use annunciator 104 will be energized, thus indicating to the pilot that the thrust reversing system should not be used in flight.

In the event of a failure of the linkages in the reverse thrust limiting apparatus as previously described, the safety spring 90 moves the downstream lever arm extension 52 and torque bar 47 to an intermediate position between the switch levers 84 and 86, so that both of the position sensor switches 80, 82 are closed. Therefore, one or the other of the reverser annunciators 104, 105 will be energized, depending upon whether the landing gear is in the up or down position. When cycling the landing gear from up to down position results in first one and then the other of the reverser annunciators 104, 105 being illuminated, this may be interpreted as an indicator of some failure in the reverse thrust limiting apparatus.

There has thus been shown and described hereinabove a reverse thrust limiting system which is particularly adapted for incorporating in existing aircraft thrust reversal systems in a manner which permits the use of such a thrust reversal system for safe deceleration in flight with a selected limited reverse thrust being available. The system described may be incorporated in existing power control systems with minimum modification. It should also be understood that apparatus of the type described may be incorporated in other mechanical systems with single or multiple control, wherein variable limited control is desired. Such variable limited control could be a function of landing gear control lever position, flap lever position, or any pilot control device or a device of the controlled mechanism. It thus may be used to limit thrust, flap position or other settings as a function of an independent variable, such as air speed or aircraft configuration, for example. The apparatus as described introduces mimimum effect on the systems to which it is added. The friction added to the cable systems is minimized by the use of the large diameter pulleys utilized as the cable drums. Over-center drive linkage actuation of the stop arms serves to reduce limitation sensitivity and hysteresis. The stop mechanism levers are concentric with the drive drum pivot axes to permit applying or disengaging the stops with the throttles in any position, thus providing a jam-proof mechanism.

Although there have been described above one particular arrangement of a reverse thrust limiting system in accordance with the present invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the appended claims.

What is claimed is:

1. Apparatus for limiting the travel of a cable driven system which includes a drive cable, the apparatus comprising:
   a cable drum for frictionally engaging the drive cable;
   projecting means attached to the drum for rotation therewith;
   variable stop means including a stop lever arm rotatably mounted to engage the projecting means in at least one stop position and an actuator coupled to the stop lever arm for moving the arm into and away from said stop position in response to applied control signals, the variable stop means being selectively positionable for engaging the projecting means to prevent rotation of the cable drum, and thereby movement of the associated drive cable, past a selected position;
   support means mounting the cable drum and the stop lever arm for rotation about a common axis; and
   coupling means coupling the actuator to the stop lever arm at a point remote from said axis.

2. Apparatus in accordance with claim 1 further including a stop member adjustably mounted on the stop lever arm for varying the point of engagement with the cable drum projecting means.

3. Apparatus in accordance with claim 1 wherein the actuator is responsive to electrical drive circuitry and further including a pair of limit switches interconnected in said circuitry for opening the actuator drive circuit at each of two opposite travel limit positions.

4. Apparatus in accordance with claim 1 further including means for mounting all of said apparatus on a common mounting plate adapted for installation as a unit in a pre-existing cable system.

5. Apparatus for selectively limiting the amount of reverse thrust to be made available in a multiple cable driven power control system driven by a plurality of drive cables for aircraft comprising:
   a plurality of cable drums, one cable drum for each drive cable in the sytem, for frictionally engaging an associated drive cable;
   means for mounting the cable drums for independent rotation;
   an actuator operable between first and second limit positions;
   a plurality of projecting elements individually mounted to the respective cable drums adjacent the periphery thereof for rotation therewith;
   drum stop means movable into and out of first positions of engagement with the cable drum projecting elements at a selected first stop position; and
   linking means coupling the drum stop means to the actuator for movement therewith.

6. Apparatus in accordance with claim 5 further including means for deenergizing the actuator at first and second travel limit positions.

7. Apparatus in accordance with claim 5 further including electrical position sensing means for sensing the presence of the drum stop means at the selected first stop position.

8. Apparatus in accordance with claim 7 further including annunciating means in circuit with the position sensing means for providing an indication of the position of the drum stop means.

9. Apparatus in accordance with claim 5 further including means for mounting first and second ones of said plurality of cable drums with their associated drum stop means for rotation about a common axis, and rigid coupling means connecting the drum stop means associated with the first and second cable drums for movement together.

10. Apparatus in accordance with claim 9 wherein the actuator is electrically driven and includes a rod movable between extended and retracted positions, an actuator lever connected to the actuator rod and pivotably mounted for rotational movement in response to the extension and retraction of the rod, and an actuator link connecting the actuator lever to one of the drum stop means.

11. Apparatus in accordance with claim 10 wherein the rigid coupling means between drum stop means associated with the first and second cable drums includes a torque tube extending between the drum stop means at points remote from the axis of rotation thereof, and a pair of torque tube levers attached to the torque tube, one adjacent each of the two drum stop means, for rotational movement with the respective drum stop means.

12. Apparatus in accordance with claim 11 further including at least one additional cable drum of said plurality of cable drums with associated peripherally mounted projecting element and corresponding drum stop means, and a link connecting the last-mentioned drum stop means with one of said torque tube levers for common movement of all of said drum stop means in response to the movement of the actuator rod.

13. Apparatus in accordance with claim 12 wherein said at least one additional cable drum includes a third and fourth cable drums mounted for independent rotation on a common axis remote from the axis of rotation of the first and second cable drums, each of the third and fourth cable drums having said associated projecting element mounted adjacent the periphery of the drum for rotation therewith, and a pair of said corresponding drum stop means individually associated with the third and fourth drums and movable in unison with the other drum stop means in response to movement of the actuator rod.

14. Apparatus in accordance with claim 13 further including a second torque tube rigidly interconnecting the drum stop means of the third and fourth cable drums.

15. Apparatus in accordance with claim 14 further including first and second position sensors mounted for sensing the second torque tube in first and second travel limit positions respectively.

16. Apparatus in accordance with claim 15 wherein the actuator is responsive to electrical drive circuitry and further including a pair of limit switches interconnected in said circuitry for opening the actuator drive circuit at each of two opposite travel limit positions.

17. Apparatus in accordance with claim 16 further comprising an electrical control circuit including a landing gear position selector switch selectively connectable in series with the actuator and said limit switches for controlling the actuator drive circuit to move all of the drum stop means to a selected first stop postion to limit engine reverse thrust to a selected low level suitable for in-flight deceleration and to move all of the drum stop means to a selected second stop position to limit engine reverse thrust to a higher level suitable for on-the-ground deceleration.

18. Apparatus in accordance with claim 17 further including landing gear position sensors and annunciating means interconnected in circuit with said first and second position sensors for providing a warning indicating that the drum stop means are not in the stop position selected by said landing gear position selector switch.

19. Apparatus in accordance with claim 18 further including a safety spring mounted to urge the second torque tube and interconnected drum stop means to an intermediate position between the first and second position sensors to provide a warning indicating a failure of a coupling between the second torque tube and the actuator.

* * * * *

UNITED STATES PATENT OFFICE
CERTIFICATE OF CORRECTION

Patent No. 4,040,581　　　　　　　Dated August 9, 1977

Inventor(s) George A. Schlanert, Lorin A. Wood and Gerald A. Rayburn

It is certified that error appears in the above-identified patent and that said Letters Patent are hereby corrected as shown below:

After the Abstract, add the following paragraph:
--The Government of the United States has rights in this invention pursuant to Contract No. F33657-72-C-0833 awarded by the Department of the Air Force.--

Signed and Sealed this

First Day of November 1977

[SEAL]

Attest:

RUTH C. MASON　　　　　　　LUTRELLE F. PARKER
*Attesting Officer*　　　　*Acting Commissioner of Patents and Trademarks*